United States Patent [19]
Shaklee et al.

[11] 3,952,209
[45] Apr. 20, 1976

[54] ELECTRICAL SYSTEM FOR AUTOMOTIVE VEHICLES AND THE LIKE

[75] Inventors: Francis Sowersby Shaklee, Southfield; Julius Neumann, Warren; Evans James Irving, Grand Rapids, all of Mich.

[73] Assignee: International Telephone and Telegraph Corporation, New York, N.Y.

[22] Filed: Sept. 9, 1974

[21] Appl. No.: 504,125

[52] U.S. Cl. ............................. 307/9; 307/10 LS
[51] Int. Cl.² ........................................ H02G 3/00
[58] Field of Search ............... 307/9, 10 BP, 10 SB, 307/10 PR, 10 AT, 10 LS, 10 R, 155, 38, 139, 140, 315, 253, 254; 315/77, 82

[56]     References Cited
          UNITED STATES PATENTS
3,274,446  9/1966  Nagata ........................... 307/315 X
3,304,540  2/1967  McAnespey ..................... 307/253 X
3,745,419  7/1973  Wright ........................... 307/10 LS
3,836,415  9/1974  Hilderbrandt .................... 307/10 R

*Primary Examiner*—Robert K. Schaefer
*Assistant Examiner*—M. Ginsburg
*Attorney, Agent, or Firm*—James B. Raden; Marvin M. Chaban

[57]              ABSTRACT

An electric power distribution system for automotive vehicles is disclosed. The system employs a bus bar which is connected to an electric power source and positioned within the vehicle in such a way as to provide a ready source of power near each power consuming device. Power control switches are coupled to control power transmission over relatively heavy conductors between the bus bar and each power consuming device. Light weight conductors are connected to the power control switches or power controllers to operate them in response to control signals provided over additional switch devices such as manually operated switches on the dashboard of the vehicle.

8 Claims, 5 Drawing Figures

3,952,209

ELECTRICAL SYSTEM FOR AUTOMOTIVE VEHICLES AND THE LIKE

BACKGROUND OF THE INVENTION

1. Field of the Invention

The present invention relates to improvements in electric power distribution systems for automotive vehicles. It relates particularly to the provision of an electric power distribution system incorporating power switches over which power is made available throughout a vehicle, and to a control system for controlling the power switches and thus the distribution of power.

2. Description of the Prior Art

Automotive vehicles require power for many elements such as running lights, turn indicator lights, emergency lights, horns, electric window lifts, radios, dome lights, air conditioners, and others. Many of these elements require the use of separate circuits, each with its own switching means. As a result, the wire networks in modern automotive vehicles have become very complicated. These systems characteristically involve dozens of separate wiring circuits to enable control of power to the moving power consuming components.

This requirement for numerous circuits has been attended by requirements for increasing amounts of current for many of the circuits. It has led to the use in each vehicle of many wires and cables having high current carrying capacity to interconnect the power supply through relatively large switches to the respective power consuming elements.

These requirements for large and heavy duty switches and especially for wiring of high current carrying capacity have placed heavy burdens on both the manufacturing and servicing of automotive vehicles. The costs in terms of materials required, space available in the vehicles, time required to assemble wiring harnesses and time to install them in the vehicles are very high. Repairs in case of failure are time-consuming and costly. The process of installing individual power lines for each function is costly in that each vehicle must have a wiring harness tailored specifically to fit it, meaning that a number of different wiring harnesses must be manufactured for each model of vehicle, depending upon optional equipment in individual examples of the model, in order to avoid excessive waste of expensive wiring.

Proposed solutions to these problems include the use of a pair of bus bars which are coupled by serially related relays to each of the power-consuming devices. U.S. Pat. Nos. 3,649,841 and 3,723,751 show such systems. Such systems include a complex network of small wires to control the relays and reduce the amount of heavy wiring. Among the disadvantages of such systems are the complex signaling and switching apparatus necessary in addition to the dual bus bar arrangement.

Other systems have been proposed which employ coded or timing signals to operate electronic switches on a time-sharing basis and couple power from a common bus bar to each power-consuming device. Examples of such systems are shown in U.S. Pat. Nos. 3,564,280 and 3,648,057. These systems substitute electronic complexity for wiring complexity. In order to minimize the number of control wires required, the code signals are transmitted on a time-division multiplex (TDM) basis over a common signal wire. This means the electronic switches must include logic means for determining which signals are pertinent to control each switch. Problems involving adequate shielding for the control wires to prevent transient voltages from disrupting the signals, of providing suitable electronic generators for the TDM signals and of providing suitable electronic logic circuits and electronic switches to respond to the signals militate against the use of such systems.

SUMMARY OF THE INVENTION

In view of the foregoing, it is an object of this invention to provide simplified wiring for automotive vehicles and the like without introducing the problems referred to above. It is a further object to provide improvements in the control of the distribution of electrical power in automotive vehicles.

To realize the foregoing and ancilary objects, an electrical system according to this invention employs a power supply line, or bus bar, which is electrically connected between a power supply and a plurality of power controllers, or switches. The controllers, or switches, are located near the power-consuming equipment and may be referred to as load-located power controllers. In preferred embodiments, these controllers may include relays or solid state devices which control the distribution of power from the bus bar to power-consuming devices. Control of each of the switches is provided over relatively light-weight signal lines, preferably in the form of flexible printed circuit assemblies, from other switches which in the main are mechanical switches controlled by hand or by mechanical or electromechanical linkages.

BRIEF DESCRIPTION OF THE DRAWINGS

The above-mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF A PREFERRED EMBODIMENT

Figure 1:
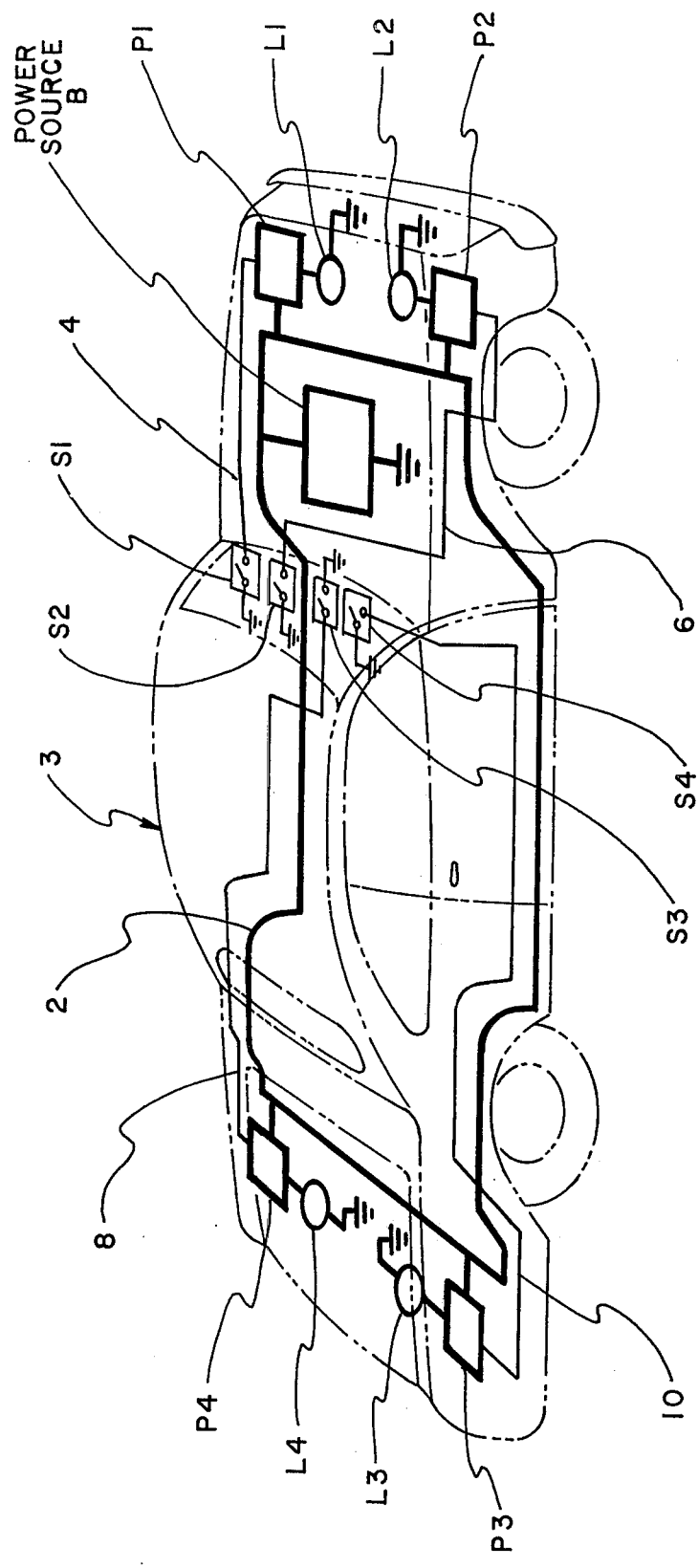
FIG. 1 is a block diagram of a vehicle with our invention schematically applied thereto.

Referring to FIG. 1, a battery B is shown which supplies power to a main power conductor supply line, or bus bar, represented by heavy lead 2. The bus bar is positioned within the vehicle to provide a source of power near each power-consuming device in the vehicle 3. A plurality of electrical load devices represented at L1, L2, L3 and L4 are disposed in different parts of the vehicle. These load devices may be lamps or other electrical components in the vehicle. One side of each electrical load L1 to L4 is electrically connected to the system ground, the system ground normally being the vehicle frame. Power is delivered from the supply load or line 2 to each electrical load L1 to L4 by means of respective switches or power controllers P1 to P4 (which may be called load-located power controllers). The power controllers characteristically are located near the respective electrical loads to provide power efficiently from the common bus bar to the loads when needed. The power controllers, or power switches, in a preferred embodiment may be relays or they may be solid state devices which respond to ground over lines 4, 6, 8 or 10 respectively, to complete circuits between the battery B and the respective loads L1 to L4. As shown in FIG. 1, these controllers may be located in the corners of the vehicle.

A number of normally open control switches are represented at S1, S2, S3 and S4. These switches, which may be located on the vehicle dashboard, may be operated by hand or by automatic means to provide control signals over respective signal feed lines 4, 6, 8 and 10. The appearance of a control signal, which is a continuous ground potential in this example, will operate the corresponding power switch or controller P1, P2, P3 or P4 thereby permitting power to flow from the supply line 2, which is capable of carrying heavy current, to the designated electrical load L1, L2, L3 or L4.

The system as shown includes four signal feed lines 4, 6, 8, and 10 which may be distributed in the vehicle in the form of a flexible flat cable, or flexible printed circuit, composed of round or flat conductors which are required to carry very little current to the power controllers. Additional feed lines to additional power controllers may, of course, be added within the scope of the invention. Some of the signal feed lines 4 to 10 may be routed through the ignition switch (not shown) so that the respective load-located power controllers will not be activated unless the ignition switch is closed.

Figure 2:
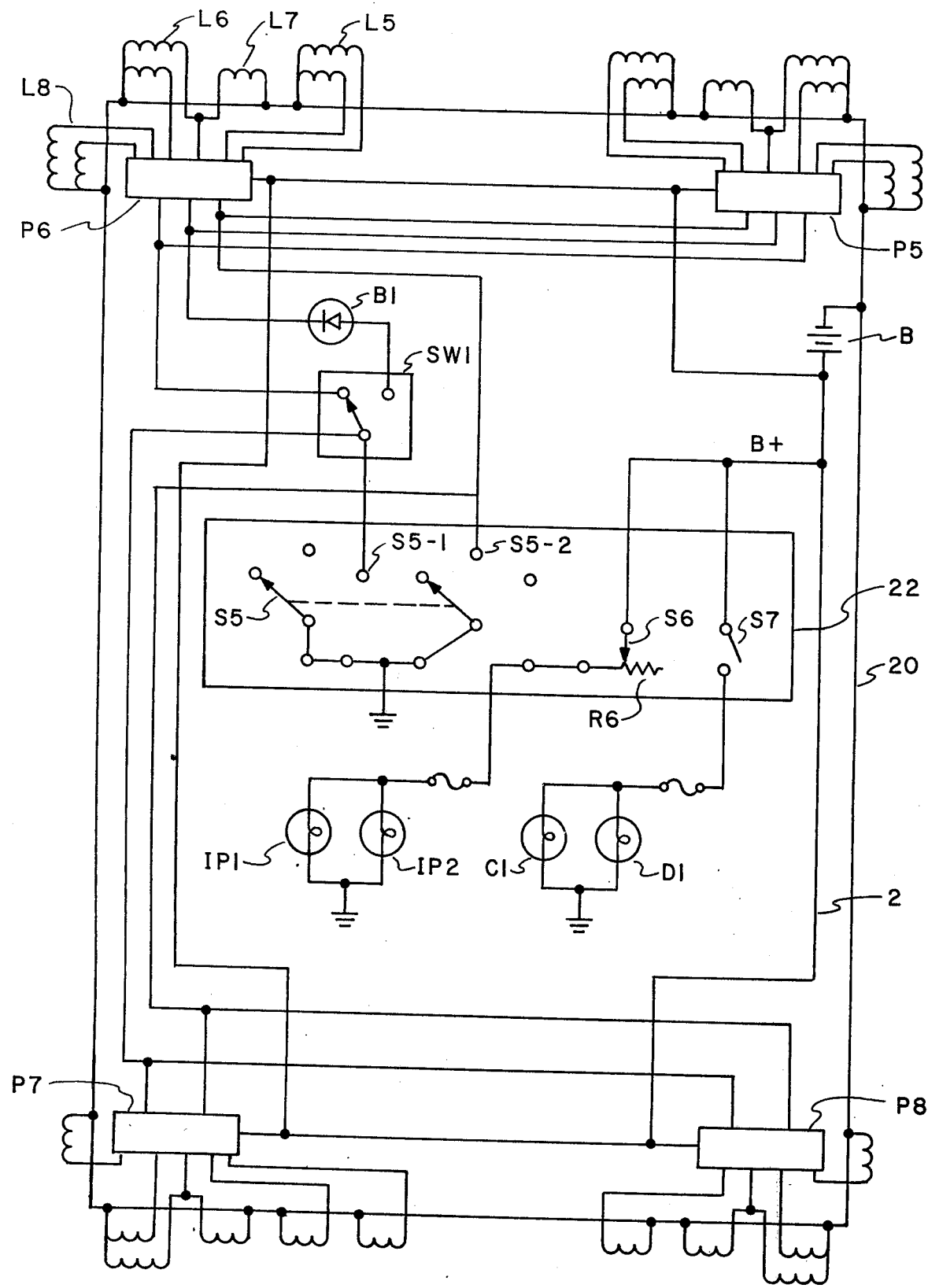
FIG. 2 is a circuit wiring diagram in greater detail of an embodiment of our invention as it could be arranged in a vehicle.

FIG. 2 is a wiring diagram, in accordance with the invention, showing additional details for application of the invention to an automobile or other vehicle. In this figure, the bus bar 2 is depicted as a wire extending in a loop within the periphery of a vehicle. An open loop of wire may be used in place of the closed loop, if found desirable. The bus bar 2 is coupled to the positive pole of the battery B. The negative terminal of the battery is connected to the frame 20 of the vehicle which then serves as the ground terminal.

An automobile dash board is depicted at 22 which supports switches, such as the gang switch S5 and independent switches S6 and S7. Switch S5 may provide ground potential over a plurality of signal lines to activate power switches at P5, P6, P7 and P8 and turn associated lamps "on" or remove ground to turn them "off." The lamps affected by power controllers or power switches at P6, for example, include those for left headlights shown as filaments at L5, L6; left front running lights at L7 and left side running and left turning lights at L8. Corresponding lamps on the right side and the rear of the vehicle will be operated by power controllers or switches at P5, P7 and P8 in response to ground potential applied through switch S5 and other control switches not shown. Such other control switches would include those operated when the brake pedal is depressed and those controlled by flashers which cause the turn indicator lamps to flash on and off intermittently to indicate that a turn is intended or to indicate the existence of an emergency status.

A dimer switch SW1 is shown between the contact S5-1 of switch S5 and the power controllers P5 and P6 to control high and low beams on the headlights at L5, L6, etc. A high beam indicator is indicated at B1. Running lights would be supplied from terminal S5-2 of switch S5 via power controllers P5, P6, P7 and P8.

A control switch S6 is shown connected in cooperation with a resistor R6 directly to the bus bar to provide current directly through a variable setting to illuminate the instrument panel lights IP1 and IP2. A dome and courtesy light switch S7, similarly controls the dome and courtesy lamps indicated at D1 and C1. The control switches S6 and S7 thus operate without the use of a power control switch. It will be seen that the instrument panel lights and the dome-courtesy lights consume only small amounts of current permitting small wires to be used to connect them to the power supply and obviating the need for separate power switches or power controllers.

Figure 3:
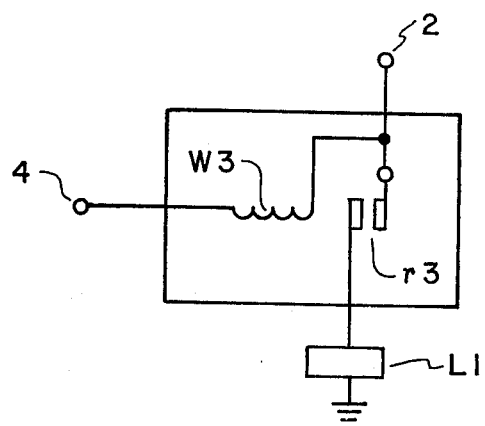
FIGS. 3, 4 and 5 are schematic circuit diagrams of various types of power controllers which could be used in the invention.
Figure 4:
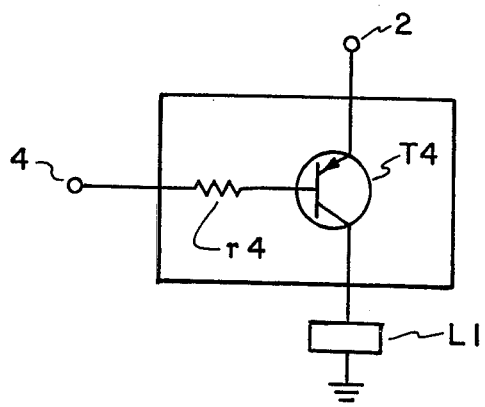
Figure 5:
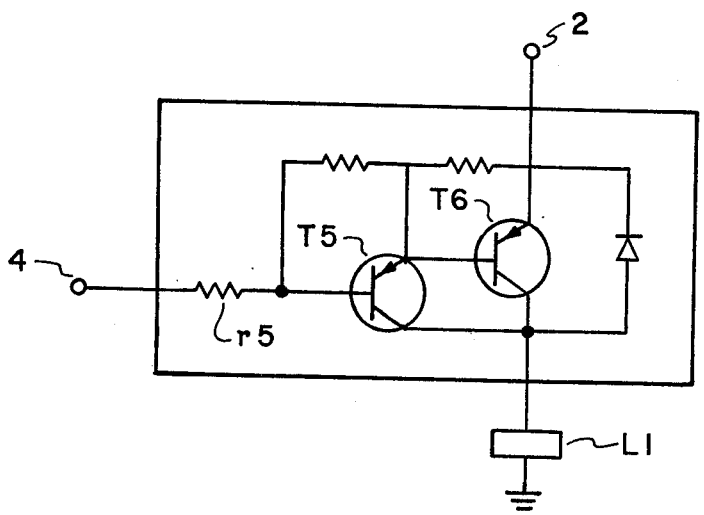

FIGS. 3, 4 and 5 represent exemplary power controllers which may be employed in the practice of the invention.

FIG. 3 discloses a relay winding W3 having a termination on one side at the power supply line 2. The numeral 4 represents the connection to the control line 4 from FIG. 1. A ground potential through S1 of FIG. 1 and line 4 may be supplied to the winding W3 to close the normally open contacts at r3. When contacts r3 close the potential from 2 will be supplied to the load L1.

Similarly, a control signal in the form of a ground potential at 4 in FIG. 4 will energize the power transistor T4 over the base resistor r4 causing the transistor to supply power from terminal 2 to the load L1.

The PNP power Darlington circuit in FIG. 5 reacts to a signal in the form of ground potential over terminal 4 and resistor r5 to energize T5 and T6 in a well known way, providing power from terminal 2 to the load L1.

In the accompanying drawings, electrical loads L1 to L4 and L5 to L8 are shown together with corresponding load-located power controllers P1 to P4 and P5 to P8 and control switches S1 to S4 and S5 to S7. It will be recognized, however, that many additional electrical loads, load-located power controllers, and control switches may be used, each control switch activating a number of load-located power controllers, and each load-located power controller delivering power to a number of loads, depending upon how many switch elements there are per power controller.

While the principles of the invention have been described above in connection with specific apparatus and applications, it is to be understood that this description is made only by way of example and not as a limitation on the scope of the invention.

We claim:

1. An electrical system for a vehicle carrying a self-contained source of electrical power, a plurality of electrical devices at various locations about the vehicle, a heavy gauge main supply conductor coupled to one terminal of said source and positioned to pass adjacent each of said devices, means for coupling said devices to the opposed terminal of said source, a plurality of controllers for individually controlling the operation of one or more of said devices, with said controllers each disposed physically adjacent said devices controlled thereby, individual heavy gauge power conductors coupling the respective controllers to said main supply conductor, heavy gauge power conductors electrically joining said controllers to the devices controlled thereby, and a plurality of independent, manually operable switches, light gauge signalling conductors each connecting each of said switches to said controllers and independently to said power source whereby responsive to selective operation of any of said switches at least one of said controllers is actuated to control the operation of any devices controlled thereby.

2. A system as claimed in claim 1, wherein the electrical system is of the direct current, grounded return type with the ground return passing through conductive body of the vehicle, and said one terminal comprises the terminal to the active or "battery" side of said source, and the other terminal comprises a coupling to grounding conductive members of the vehicle.

3. A system as claimed in claim 2, wherein each of said signalling conductors comprise a unitary conductive lead from ground to a switch and from the switch to a controller, and wherein each said conductor is a separable part of a flexible printed circuit.

4. A system as claimed in claim 1, wherein said main supply conductor comprises a single cable member coupling said source to said controllers in parallel.

5. An electrical system for an automotive vehicle comprising a power supply conductor from a self-contained power source on said vehicle, a plurality of power loads dispersed about said vehicle, a plurality of power controllers with each of said controllers being physically adjacent one of said loads, individual conductors connecting each load to the adjacent controller and to one terminal having electrical connection with said power source, a plurality of manually operable control switches at convenient locations about said vehicle, each of said switches having an independent connection to the other terminal of said power source for operation independently of the other switches, each of said switches having a connection over a signalling conductor to one or more of said controllers, said controllers individually responsive to selective operation of the switch connected thereto over said signalling conductors to complete a supply conductor path to the loads connected to the respective controllers.

6. The invention as claimed in claim 5 in which the power controllers are solid state devices which are selectively rendered conductive responsive to signals from said control switches, thereby providing power to the loads.

7. The invention as claimed in claim 5, in which the power controllers include Darlington circuits coupled to be rendered conductive responsive to signals received from the control switches.

8. The invention as claimed in claim 5, in which the power controllers include relay means.

* * * * *